US012693159B1

(12) United States Patent  
Deliwala

(10) Patent No.: US 12,693,159 B1  
(45) Date of Patent: Jul. 28, 2026

(54) MULTIPLE INPUT SPECTROMETER

(71) Applicant: Emcode Photonics LLC, Andover, MA (US)

(72) Inventor: Shrenik Deliwala, Andover, MA (US)

(73) Assignee: Emcode Photonics LLC, Andover, MA (US)

( * ) Notice: Subject to any disclaimer, the term of this patent is extended or adjusted under 35 U.S.C. 154(b) by 52 days.

(21) Appl. No.: 18/886,840

(22) Filed: Sep. 16, 2024

Related U.S. Application Data

(60) Provisional application No. 63/582,615, filed on Sep. 14, 2023.

(51) Int. Cl.  
*G01J 3/02* (2006.01)  
*G01J 3/10* (2006.01)  
(Continued)

(52) U.S. Cl.  
CPC ........... *G01J 3/0294* (2013.01); *G01J 3/0291* (2013.01); *G01J 3/10* (2013.01); *G01J 3/28* (2013.01);  
(Continued)

(58) Field of Classification Search  
CPC .......... G01J 3/0294; G01J 3/0291; G01J 3/10; G01J 3/28; G01J 3/502; G01J 2003/102;  
(Continued)

(56) References Cited

U.S. PATENT DOCUMENTS

| 7,265,830 B2 | 9/2007 | Wang |
| 7,339,170 B2 | 3/2008 | Deliwala |
| | (Continued) | |

FOREIGN PATENT DOCUMENTS

| CN | 117561426 | 2/2024 |
| DE | 102010053978 | 6/2012 |
| | (Continued) | |

OTHER PUBLICATIONS

"International Application Serial No. PCT US2022 017503, Invitation to Pay Additional Fees mailed May 24, 2022", 21 pgs.  
(Continued)

*Primary Examiner* — Tarifur R Chowdhury  
*Assistant Examiner* — Kaitlyn E Kidwell  
(74) *Attorney, Agent, or Firm* — Schwegman Lundberg & Woessner, P.A.

(57) ABSTRACT

A concurrently measuring multiple light input spectrometer with a shared or common optical path is described. The spectrometer can help eliminates errors from dark offsets, can reduce impact of ambient optical and electrical noise, and can mitigate temperature effects. Additionally, it can help readily provide wavelength calibration. By using just two inputs, spectrometer can provide true spectral measurement of the test object by continuous measurement of the spectra of the source and the spectra of the source light after interacting with the test object. More generally, including an individual photodetector (instead of an array of multiple photodetectors) associated with each input can help address solving the problems that may get introduced by using multiple photodetectors for a particular input.

10 Claims, 6 Drawing Sheets

(51) Int. Cl.
  *G01J 3/28* (2006.01)
  *G01J 3/50* (2006.01)
(52) U.S. Cl.
  CPC ......... *G01J 3/502* (2013.01); *G01J 2003/102* (2013.01); *G01J 2003/2843* (2013.01)
(58) Field of Classification Search
  CPC ............. G01J 2003/2843; G01J 3/2823; G01J 3/2803; G01J 3/433; G01J 2003/451; G01J 3/45; G01J 3/0229; G01J 3/42; G01J 2003/4332; G01J 3/0208; G01J 3/024; G01J 2001/446; G01J 3/4338; G01J 3/501; G02B 2207/129
  See application file for complete search history.

(56) References Cited

U.S. PATENT DOCUMENTS

| | | | |
|---|---|---|---|
| 9,130,070 | B2 | 9/2015 | Deliwala et al. |
| 9,341,565 | B2 | 5/2016 | Lamego et al. |
| 10,056,868 | B2 | 8/2018 | Deliwala et al. |
| 10,066,977 | B2 | 9/2018 | Hasson et al. |
| RE48,996 | E | 3/2022 | Deliwala et al. |
| 11,704,886 | B2 | 7/2023 | Deliwala |
| 12,165,372 | B2 | 12/2024 | Deliwala |
| 12,307,731 | B2 | 5/2025 | Deliwala |
| 12,458,260 | B1 | 11/2025 | Deliwala |
| 2002/0001080 | A1 | 1/2002 | Miller et al. |
| 2005/0058352 | A1* | 3/2005 | Deliwala ................. G01J 3/021 382/232 |
| 2005/0270528 | A1 | 12/2005 | Geshwind et al. |
| 2005/0286049 | A1 | 12/2005 | Hagler |
| 2006/0038997 | A1* | 2/2006 | Julian ................... G01J 3/0205 356/328 |
| 2007/0093717 | A1 | 4/2007 | Nagar et al. |
| 2007/0296969 | A1 | 12/2007 | Goldstein et al. |
| 2010/0008588 | A1 | 1/2010 | Feldkhun et al. |
| 2010/0056928 | A1 | 3/2010 | Zuzak et al. |
| 2012/0080611 | A1 | 4/2012 | Jones et al. |
| 2012/0248985 | A1 | 10/2012 | Lin et al. |
| 2012/0307081 | A1 | 12/2012 | Dewald et al. |
| 2014/0233028 | A1 | 8/2014 | Englund |
| 2015/0177064 | A1* | 6/2015 | Wedelsback .......... G01J 3/0229 356/328 |
| 2015/0241003 | A1 | 8/2015 | Ikami |
| 2017/0059408 | A1 | 3/2017 | Körner et al. |
| 2017/0164848 | A1 | 6/2017 | Nadeau et al. |
| 2018/0136042 | A1 | 5/2018 | Goldring et al. |
| 2019/0150839 | A1 | 5/2019 | Kurfiss et al. |
| 2020/0011734 | A1 | 1/2020 | Lee et al. |
| 2022/0163634 | A1 | 5/2022 | Gorman et al. |
| 2023/0041114 | A1 | 2/2023 | Seider et al. |
| 2023/0108409 | A1 | 4/2023 | Deliwala |
| 2023/0113897 | A1 | 4/2023 | Deliwala |
| 2024/0362883 | A1 | 10/2024 | Deliwala |
| 2025/0272940 | A1 | 8/2025 | Deliwala |

FOREIGN PATENT DOCUMENTS

| | | |
|---|---|---|
| IN | 202317058208 | 12/2023 |
| WO | 2022182747 | 9/2022 |
| WO | 2026096535 | 5/2026 |

OTHER PUBLICATIONS

"International Application Serial No. PCT US2022 017503, International Search Report mailed Sep. 9, 2022", 8 pgs.
"International Application Serial No. PCT US2022 017503, Written Opinion mailed Sep. 9, 2022", 26 pgs.
"U.S. Appl. No. 18/045,695, Notice of Allowance mailed Feb. 16, 2023", 10 pgs.
"U.S. Appl. No. 18/045,701, Non Final Office Action mailed Mar. 31, 2023", 28 pgs.

"U.S. Appl. No. 18/045,701, Response filed Jun. 27, 2023 to Non Final Office Action mailed Mar. 31, 2023", 26 pgs.
"U.S. Appl. No. 18/045,701, Examiner Interview Summary mailed Jun. 28, 2023", 2 pgs.
"U.S. Appl. No. 18/045,701, Final Office Action mailed Aug. 31, 2023", 40 pgs.
"International Application Serial No. PCT US2022 017503, International Preliminary Report on Patentability mailed Sep. 7, 2023", 28 pgs.
"U.S. Appl. No. 18/045,701, Response filed Oct. 31, 2023 to Final Office Action mailed Aug. 31, 2023", 34 pgs.
"U.S. Appl. No. 18/045,701, Advisory Action mailed Nov. 15, 2023", 3 pgs.
"Chinese Application Serial No. 202280023465.1, Notification to Make Rectification mailed Nov. 1, 2023", with machine translation, 3 pgs.
"U.S. Appl. No. 18/045,701, Response Filed Nov. 21, 2023 to Advisory Action mailed Nov. 15, 2023", 34 pgs.
"U.S. Appl. No. 18/045,701, Non Final Office Action mailed Feb. 29, 2024", 43 pgs.
"U.S. Appl. No. 18/045,701, Examiner Interview Summary mailed Apr. 9, 2024", 2 pgs.
"U.S. Appl. No. 18/045,701, Response filed Apr. 29, 2024 to Non Final Office Action mailed Feb. 29, 2024", 24 pgs.
"U.S. Appl. No. 18/045,701, Notice of Allowance mailed Jul. 9, 2024", 12 pgs.
"U.S. Appl. No. 18/751,080, Non Final Office Action mailed Sep. 13, 2024", 41 pgs.
"U.S. Appl. No. 18/045,701, 312 Amendment filed Oct. 7, 2024", 18 pgs.
"U.S. Appl. No. 18/045,701, Corrected Notice of Allowability mailed Oct. 11, 2024", 4 pgs.
"U.S. Appl. No. 18/045,701, PTO Response to Rule 312 Communication mailed Oct. 15, 2024", 2 pgs.
"Chinese Application Serial No. 202280023465.1, Voluntary Amendment filed May 28, 2024", with English claims, 49 pgs.
"Chinese Application Serial No. 202280023465.1, Response filed Jan. 8, 2024 to Notification to Make Rectification mailed Nov. 1, 2023", with machine translation, 62 pgs.
"U.S. Appl. No. 18/751,080, Response filed Dec. 13, 2024 to Non Final Office Action mailed Sep. 13, 2024", 17 pgs.
"U.S. Appl. No. 18/751,080, Notice of Allowance mailed Jan. 23, 2025", 14 pgs.
"U.S. Appl. No. 18/751,080, 312 Amendment filed Jan. 27, 2025", 10 pgs.
Caramazza, Piergiorgio, "Transmission of natural scene images through a multimode fibre", Nature Communications https: doi.org 10.1038 s41467-019-10057-8, (2019), 1-6.
Sugimoto, Nobuo, "Hadamard transform active long-path absorption spectrometer system for measurements of atmospheric trace species", Applied Optics, vol. 25, No. 6, (Mar. 15, 1986), 863-865.
"European Application Serial No. 22717028.9, Communication Pursuant to Article 943 EPC mailed Dec. 5, 2025", 5 pgs.
"U.S. Appl. No. 18/751,080, PTO Response to Rule 312 Communication mailed Feb. 4, 2025", 2 pgs.
"U.S. Appl. No. 18/751,080, 312 Amendment filed Mar. 28, 2025", 3 pgs.
"U.S. Appl. No. 18/751,080, PTO Response to Rule 312 Communication mailed Apr. 7, 2025", 2 pgs.
"U.S. Appl. No. 19/038,262, Preliminary Amendment Filed May 19, 2025", 8 pgs.
"U.S. Appl. No. 18/929,298, Notice of Allowance mailed Jul. 9, 2025", 9 pgs.
"U.S. Appl. No. 18/929,298, Corrected Notice of Allowability mailed Jul. 25, 2025", 3 pgs.
"International Application Serial No. PCT US2025 052960, International Search Report mailed Mar. 31, 2026", 6 pgs.
"International Application Serial No. PCT US2025 052960, Written Opinion mailed Mar. 31, 2026", 11 pgs.
"Chinese Application Serial No. 202280023465.1, Office Action mailed Apr. 4, 2026", w English Translation, 25 pgs.

* cited by examiner

STEP 2: Measure white to extract source spectrum $S_{wh}(\lambda)$

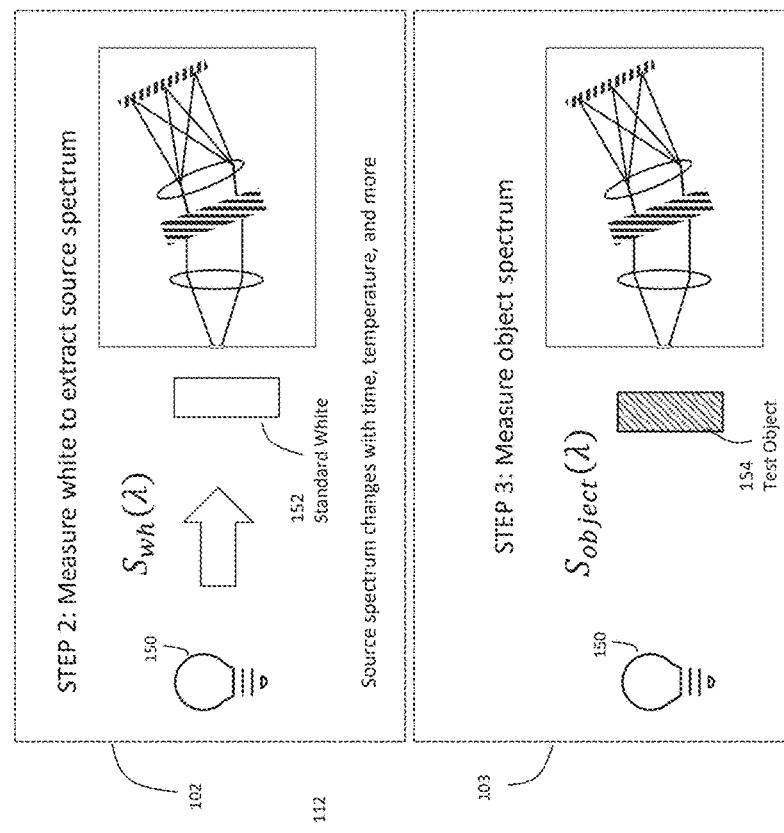

152

Standard White

Source spectrum changes with time, temperature, and more

150

102

STEP 3: Measure object spectrum $S_{object}(\lambda)$

150

154

Test Object

103

112

STEP 1: Block input and measure dark $S_{dark}(\lambda)$

150

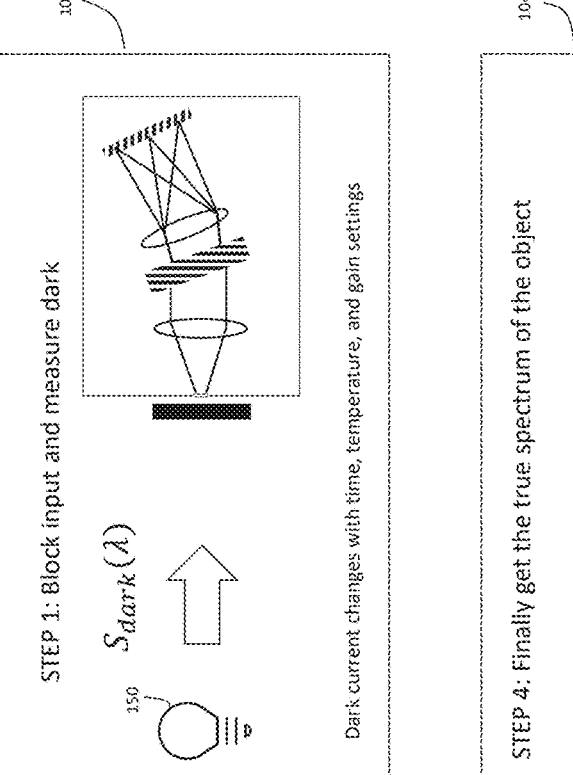

Dark current changes with time, temperature, and gain settings

101

STEP 4: Finally get the true spectrum of the object $$S_{True}(\lambda) = \frac{S_{object}(\lambda) - S_{dark}(\lambda)}{S_{wh}(\lambda) - S_{dark}(\lambda)}$$

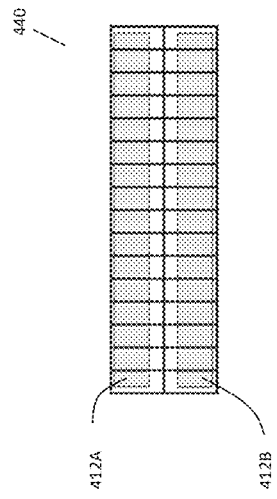
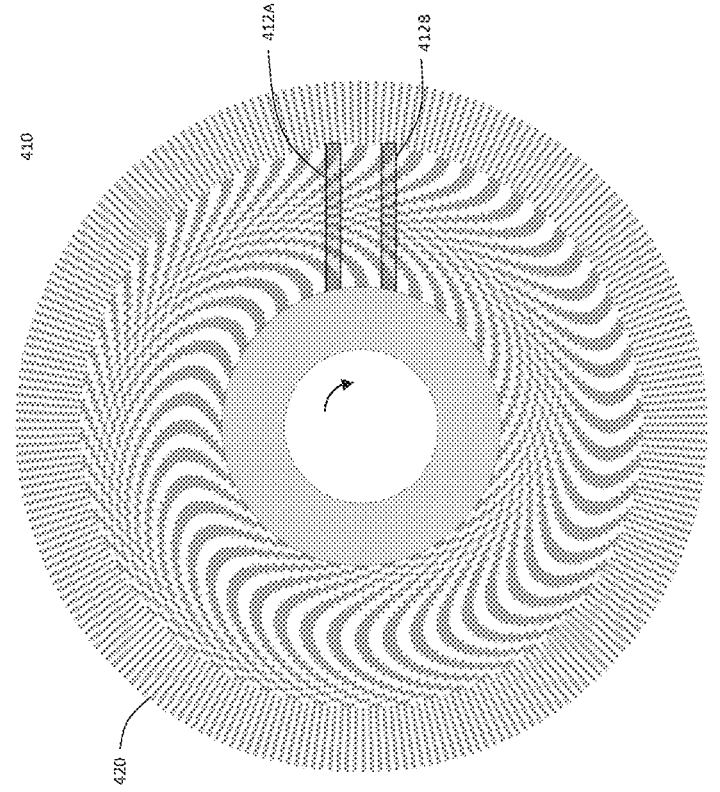
FIG. 4

MULTIPLE INPUT SPECTROMETER

CLAIM OF PRIORITY

This patent application claims the benefit of priority of Deliwala U.S. Provisional Patent Application Ser. No. 63/582,615 entitled MULTIPLE INPUT SPECTROMETER, filed Sep. 14, 2023, which is hereby incorporated by reference herein in its entirety.

CROSS-REFERENCE TO RELATED PATENT DOCUMENTS

This patent application is related to U.S. Provisional Patent Application Ser. No. 63/200,241 entitled CODED LIGHT FOR TARGET IMAGING OR ANALYSIS, filed Feb. 24, 2021, naming Shrenik Deliwala as inventor, which application is hereby incorporated herein by reference in its entirety.

This document also incorporates by reference each of the following:

1. U.S. Pat. No. 11,704,886;
2. U.S. patent application Ser. No. 18,045,701; and
3. International Patent Application Serial No. PCT/US2022/017503, filed Feb. 23, 2022, which claims the benefit of priority to U.S. Provisional Application Ser. No. 63/262,370, filed Oct. 11, 2021; and 63/202,325, filed Jun. 7, 2021; and 63/200,241, filed Feb. 24, 2021, each of which are incorporated by reference herein in their entirety.

TECHNICAL FIELD

This document pertains generally, but not by way of limitation, to systems, devices, and methods for using coded light, such as for target imaging or analysis of a fixed target, or of moving target, for example, for semiconductor or other manufacturing or materials processing or inspection.

BACKGROUND

A standard diode-array based spectrometer can be used to measure the illumination response spectrum of a target object, region, or scene for analysis.

SUMMARY

This document describes systems, devices, and methods that can improve on a standard diode-array based spectrometer and that can provide a method to directly measure the spectrum of at least two inputs. The present techniques can additionally provide methods to calibrate the wavelength axis of the spectrometer, such as based on various wavelength standards.

Input light can be dispersed into its spectral components, which can be referred to as spectral bins, that can be dispersed such as along a dispersion axis. The spectral bins can be modulated. For example, each spectral bin can be independently modulated using a unique time-modulated function, such as by using a spatial light modulator (SLM) with high fidelity. After modulation, these spectral components can be recombined on a photodetector by recombining the spectral components. Multiple spectrometer inputs can be provided, such as along an axis perpendicular to the dispersion axis, and can respectively be mapped to individual ones of multiple photodetectors. An output of each of the photodetectors can be digitized, such as by performing analog-to-digital conversion using an analog-to-digital converter (ADC) circuit. The digitized signal can be used to extract the spectrum of the light, such as can include a process of demodulation, as each modulation function is uniquely associated with a particular spectral bin. The demodulation can be carried out using both the knowledge of the time-modulated functions imposed on the dispersed optical signal by the spatial light modulator and time-synchronization between modulation and each of digitization by the ADC, demodulation, and further processing of the digitized data to reconstruct a spectrum of coded light.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 1: shows an example of an approach of spectroscopy with problems to be solved.

FIG. 4 shows examples of optical modulators used in the construction of a coded light spectrometer.

DETAILED DESCRIPTION

Figures 2A, 2B:
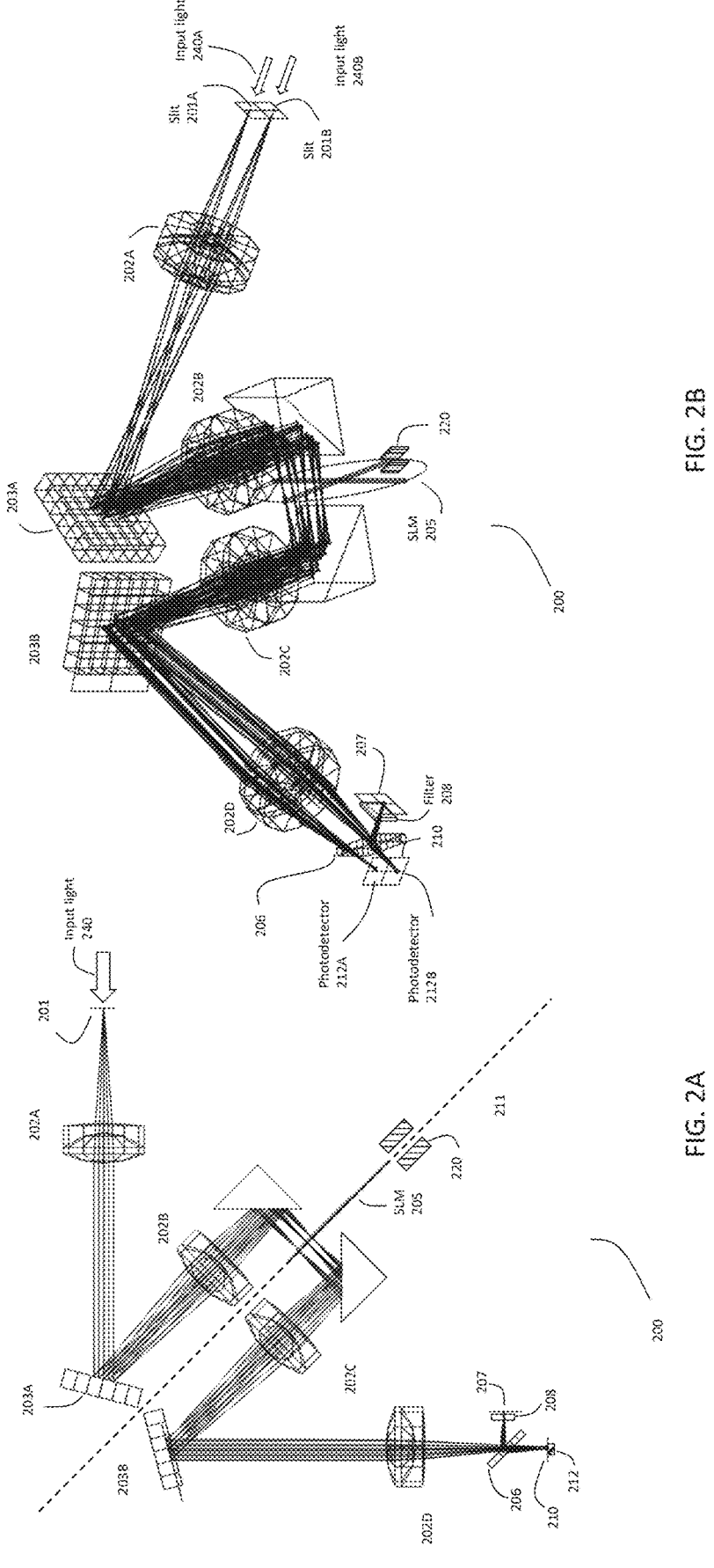
FIGS. 2A-2B: shows an example of a coded light approach for solving such problems.

FIG. 1 illustrates an approach of spectroscopy using a diode array-based spectrometer. The spectrometer of this approach works by imaging a narrow slit 140 or other aperture, e.g., in an opaque spectrometry optics housing 141 enclosing spectroscopy optics componentry, which is illuminated by input light 142 from a light source 150 and directed toward a photodiode array 144 in the housing 141 after the light has been passed through a dispersive system 146 in the housing 141. Different spectral components are spatially mapped onto different photodiodes of the photodiode array 144 and measured.

A spectrometry task involves measuring the true spectrum of the incident input light 142. Due to the wavelength dependence of almost all the of the components of the spectrometer-transmission or reflection efficiency of the dispersive system 146 such as gratings, mirrors or lenses, and responsivity of the photodiodes in the photodiode array 144—the measurement of the input spectrum does not necessarily provide the true spectrum of the incident input light 142. To measure the true spectrum of the incident input light 142, the first two steps 101 and 102 of the approach shown in FIG. 1 can be performed before making any true spectroscopic measurements of a target test object 154.

At 101, incident input light 142 can be blocked, such as by an opaque shutter 148 covering the slit 140 or other light-transmissive aperture in an opaque baffle portion of the housing 146, or the light source 150 can be turned off to measure the dark offset of each of the incident light detection photodiodes of the photodiode array 144. These offsets are dependent on the temperature, gain settings, or both, and tend to change over time. For photodiodes in the photodiode array 144 with low band gap such as InGaA, GaSb, or InSb or many other similar materials, the photodiodes of the photodiode array 144 can be cooled to reduce the dark current offsets.

Then, at 102, the spectrum of the light source 150 can be measured by direct illumination or reflected or scattered illumination from a "standard white" surface 152. This step can be used to correct for the wavelength dependence in the spectrometer as well as the spectrum of the light source 150 itself. Only after 101 and 102 are complete can the actual spectral measurement of the test object 154 be carried out, such as shown in 103. The results of the previous steps can be combined to generate a true spectrum, such as by performing signal processing computation such as shown at 104. The steps 101 and 102 need to be repeated quite often, and are dictated by the requirements on accuracy and expected drifts in light sources 150 or dark offsets. For example, in a measurement of visual color, most manufacturers recommend making a "white standard" measurement before every actual test object measurement or once per hour or once per day, etc. Furthermore, any ambient light leakage can seriously impact measurements of step 101 and step 102 and can result in an erroneous final spectrum in step 104.

Such measurements can be "automated" by having mechanical shutters and various methods that automate these steps. Nonetheless, these steps 101 and 102 consume time and come in the way of measurement of the test object 154 at step 103 and there is no way to guarantee the accuracy except by repeating steps 101 and 102.

Furthermore, the mapping of the spatial location of a particular pixel in the photodiode array 144 to the wavelength of light can be carried out using a special calibrated light source (e.g., an emission standard) or an atomic absorption standard. This can be done at the factory and saved in the local memory of the spectrometer and rarely need be repeated while taking actual experimental data, since this is even more cumbersome and time consuming. Mechanical changes, small knocks, or just misalignment of optical components over time can cause change in the wavelength-to-pixel map, but there is no way to measure this change without repeating the wavelength calibration. This may require that the instrument be sent to the manufacturer, such as for re-calibration.

FIG. 2A shows an example configuration of the present approach that can include an embodiment 200 of a system that can help address or even overcome all of the above-described limitations of the approach described with respect to FIG. 1. The approach shown in FIG. 2A can help eliminate the need for dark offset measurement because the measured spectrum is modulated and thus low frequency drifts in the dark current or DC shifts in the amplifier are automatically eliminated (e.g., eliminate step 101), and by continuously and concurrently measuring the source or reference spectrum (e.g., automate 102) and by providing techniques of continuous or recurrently ongoing wavelength calibration. Furthermore, this approach makes possible eliminating or substantially reducing temperature-related changes in electronics, mechanics, as well as in the responsivity of the photodiodes in the photodiode array 144. In many commercially important and price sensitive markets, it would be economically advantageous to use uncooled photodetectors. The present approach includes a proposed technique that can help eliminate dark current and 1/f noise and can help increase the signal level such as by eliminating a photodiode array 144 and replacing it with a single photodetector corresponding to each of the spectral measurement channels and thus eliminating variations among the elements of the photodiode array 144.

The light entering the slits 201 or other aperture defined in an opaque baffle portion of a spectrometry optics housing 141, enclosing spectroscopy optics, such as including a commonly-shared optical dispersion system of optics componentry that can be commonly-shared by two or more independent input light sources. The commonly-shared optical dispersion system can include a collimator 202A. The collimator 202A can collimate light such as can be received via respective slits 201 in the spectrometry optics housing 141 from corresponding independent light sources. The light collimated by the collimator 202A can be further modified by the optical dispersion system, such as by being then dispersed by the transmissive or (as shown) reflective diffraction grating 203A. The dispersed light output directed by the grating 203A of the commonly-shared optical dispersion system can then be focused on a commonly-shared spatial light modulator (SLM) 205 such as with the aid of a commonly-shared refractive element such as a lens 202B, commonly-shared one or more mirrors, or both. In the photodiode array-based spectrometer approach of FIG. 1, the photodiode array 144 would be placed at the focus, where the SLM 205 is located, to measure the spectrum. In the present approach, such a photodiode array 144 is not required. Instead, each of the spectral components can be temporally modulated by the commonly-shared SLM 205, shown as patterned rotating disk that provides different individual pre-specified modulation functions, that can be synchronized to each other (and in case of a rotating disk, automatically synchronized to each other by virtue of fixed pattern on the disk) and that can also be synchronized to the signal recovery and processing for demodulation. A timing signal can be helpful, and for disk-based modulation by an optical pick-up 220 associated with the SLM 205, the timing signal of a printed pattern on the rotating disk can be used to pick up the precise location (e.g., within a rotation of the SLM modulation disk 205) and generate a corresponding timing reference from the illumination side of the system, which can then be used for signal processing on the receive side. The SLM modulation disk 205 imposes (encodes) unique temporal variations in the intensity or phase of each of the spectral components along the axis of dispersion. After modulation, the spectral components can be recombined, such as by use of a refractive element such as a lens 202C, a diffractive element such as a grating 203B, and a refractive element such as lens 202D. After recombining, the image of the slit 201 is formed at the output focal plane 210. This image includes the underlying spectral components that are temporally modulated. A photodiode 212 can be placed in the focal plane at or near 210 to collect the input light, such as for signal-processing and measurement. The present approach can permit replacing the photodiode array 144 of the spectrometer approach of FIG. 1 with a single photodiode 212. In this way, this photodiode 212 receives the total light signal and is larger than the signal received by individual photodiodes of the photodiode array 144 of multiple photodiodes. The electrical signal from the photodiode 212 can be amplified and digitized, such as in synchronization with the illumination modulation by using timing reference signals from the SLM modulation disk 205. By performing orthogonal decomposition of the modulation functions imposed by SLM 205, individual intensities of the spectral components can be recovered on the receive side in signal-processing provided by a computer or other processor configured for such signal-processing and an indication of the resulting measured spectrum can be provided to the user. In the approach shown in FIG. 2A, it can be seen that the information about the spectral intensity is coded in the modulation that occupies higher signal frequencies. This means that the low frequency noise sources and DC dark currents are ignored in the current approach, as shown in FIG. 2A. Thus, there is no need to carry out step 101 of the spectrometry approach described with respect to FIG. 1. Additionally, because in the present approach, such as shown in FIG. 2A, we only recover information corresponding to the imposed modulation, the effect of ambient light (with large DC or low frequency components) or electromagnetic interference can be reduced or eliminated. Furthermore, since all the spectral components fall on the same photodetector, e.g., photodiode 212, there is a substantial increase in signal relative to the signal on the individual photodiodes in the photodiode array 144 of a multi-photodiode spectrometer approach such as shown in FIG. 1. The elimination of dark current in measurement and this increase in signal together allows the use of an uncooled photodetector, e.g., photodiode 212, where cooled photodetectors would otherwise be necessary. In some cases, the present approach may have to cool only slightly, such as compared to an approach as shown in FIG. 1.

FIG. 2B is a three-dimensional (3D) view of the approach shown in FIG. 2A, showing an example of how to use the axis perpendicular to the dispersion axis to enable providing multiple spectral measurements, such as of input light 240A and of input light 240B. Since the slit 201 plane is imaged onto the output plane 210, the spectrometry optics housing can define two slits 201A and 201B or other apertures in the slit 201 plane that can be separated and spaced apart from each other vertically (or in direction perpendicular to the direction of dispersion along the dispersion axis). In this approach, the spectrometry system can generate a temporally modulated signal at two corresponding locations 210A and 210B on the output plane 210, at which two corresponding light transducers such as photodetectors 212A and 212B can be located. The photodetectors 212A and 212B can together recover two independent spectra of the two slits 201A and 201B, such as by performing identical mathematical signal-processing recovery (e.g., including demodulation or decoding of the modulation functions encoded onto the illumination light) on the signals output from the respective photodetectors 212A and 212B. The light from respective ones of the two slits 201A and 201B travels substantially through the same optics and mechanical system, and thus is spectrally modified in a similar way. Furthermore, the two photodetectors 212A and 212B can be matched to each other quite closely and can be placed on the same electronics board at or near the output plane 210, and thus are affected similarly by temperature and other environmental parameters.

While only two input slits 201A and 201B and two corresponding photodiodes 212A and 212B are shown in FIG. 2B, for illustrative clarity, three or four or even 10 of either or both are possible. In such a case, each of the input slits 201A . . . 201N has its own corresponding photodiode 212A . . . 212N and signals from each of the photodiodes 212A . . . 212N can be independently analyzed to produce multiple spectral outputs.

Multiple slits 201A . . . 201N along the vertical direction can be individually displaced from each other by opaque regions, such as along the dispersion axis.

Further, wavelength calibration can be provided, if desired. For example, suppose that we mark (without loss of generality) that the bottom slit 201B is for measurement of the source spectrum (Spectrum B), from the light source. A small portion of the source spectrum may be sampled, such as by a beam splitter 206. This beam splitter 206 can include a thin piece of glass, such as providing roughly 10% reflectance from the two uncoated face surfaces of the thin piece of glass. This sampled portion of the light can be transmitted through one or more of many available atomic absorption standards 207, such as BG36 absorption glass. In this case, a photodetector 214 placed at a location at or beyond a far side of the absorption standard 207 to produce the reference Spectrum C after the same mathematical analysis as discussed earlier. By dividing this reference Spectrum C with Spectrum B (the one designated to measure the light source spectrum), the spectrum of the filter 208 glass is produced and can be stored in the system memory of the spectroscopy system. This stored result can be compared with tabulated spectra of these glass materials, and the wavelength can be assigned to each of the modulation functions being used to encode different spectral components or spectral bins. This can be accomplished using one or more optimization or minimization algorithms in which the measured spectra or its derivative(s) is compared against the corresponding tabulated spectra or its derivative(s) until a satisfactory match is found. Thus, the present approach such as shown in FIG. 2B can help reduce or eliminate the need for cumbersome and time-consuming wavelength calibrations that involve highly trained personnel, and that can only be done in carefully controlled laboratory environments. While, we have shown wavelength calibration using a transmissive standard in FIGS. 2A and 2B, one can as alternatively optionally use a reflective standard, if desired.

In sum, by temporally coding different spectral bin components from different slit locations and then combining them back onto corresponding individual photodetectors, multiple inputs can be monitored. Furthermore, additional spectrum measurement channels, such as to carry out real-time wavelength calibration, can be provided.

Figure 3:
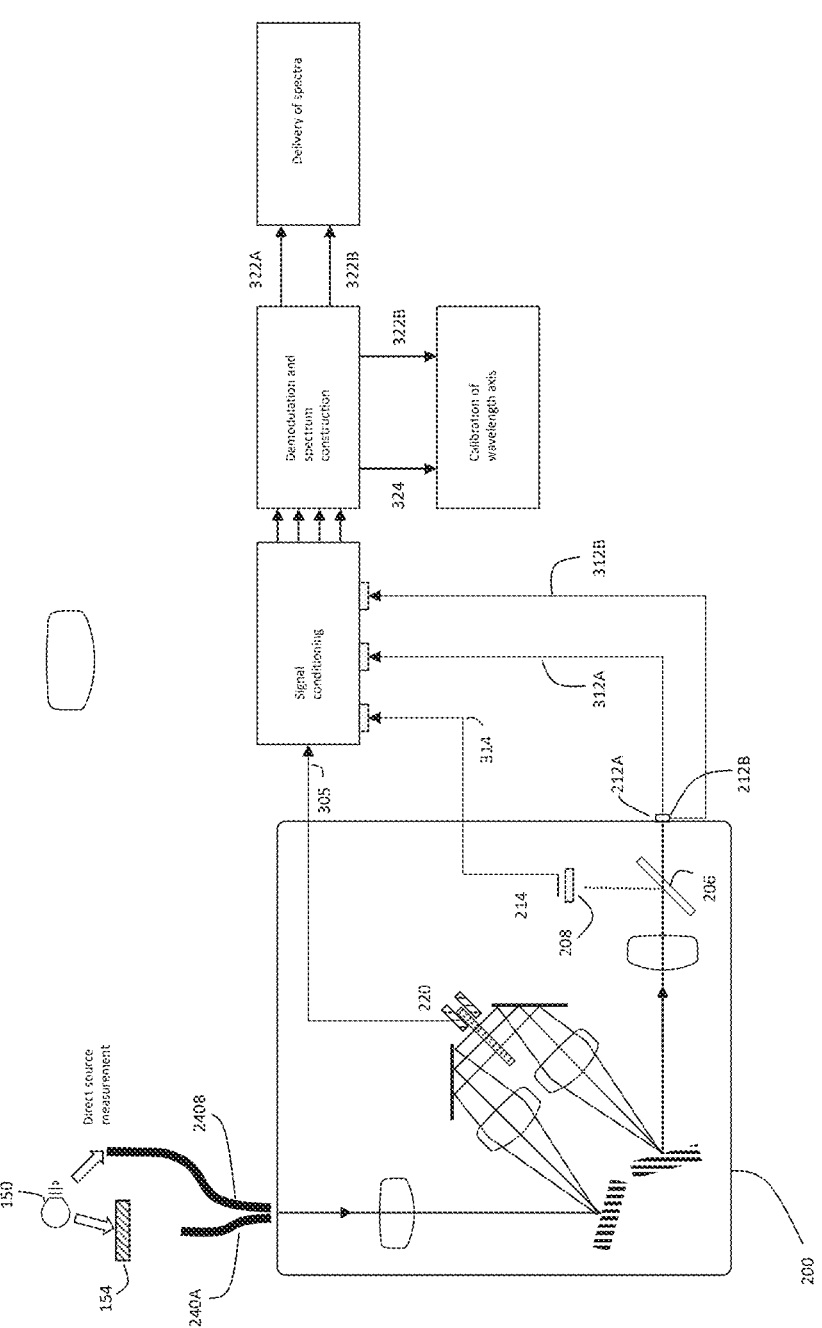
FIG. 3: shows an example of a system diagram and a use case.

FIG. 3 shows an example of portions of the present spectroscopy system in a measurement configuration with related electronic and digital processing. As shown, the two inputs to the spectrometer can correspond to any two input light beams, such as from one or more light sources 150. A dual fiber optic cable can provide dual light conduits 240A and 240B that can respectively collect light beams from two light input locations, and can illuminate the two corresponding slit locations 201A and 201B with corresponding input light beams.

In FIG. 3, the light conduit 240A can be arranged to collect input light after the input light has interacted with the test object 154, and the light conduit 240B can be arranged to collect source light that has not interacted with the test object 154, such as for measurement of source spectrum of the light source 150 itself. The light carried by the light conduit 240B from the light source 150 can be further split by a beam splitter 206, such as to provide wavelength calibration, such as described above. Together, the three photodiodes 212A-C can respectively generate representative electrical output signals 312A, 312B, and 314.

These electrical output signals 312A, 312B, and 314, along with the timing signal 305, such as from the SLM modulation disk 205, can be signal-conditioned and digitized by the signal processing circuitry 315, such as using the timing reference 305 to synchronize demodulation of the electrical output signals to modulation of the illumination light directed to the target object 154. The digital signal processing circuitry 316 can include a demodulator that can carry out demodulation of the modulation functions (which were used to encode the input illumination light) by using one or more mathematical techniques, such as Fast Fourier Transforms, to generate amplitude and phase information for each of the coded spectral components. For example, signal-processed amplitude information from the electrical signals 312A, 312B, and 314 can be stored and used to form the corresponding spectra of the three channels denoted 322A, 322B, and 324. The corresponding phase information may also be stored, such as to help perform better averaging of spectra. By dividing the spectrum 322A by 322B, the test object 154 spectrum can be delivered without worries of dark current changes or matching of pixels on the photo-diode array 144. This division providing the divided-out spectrum is also independent of changes in the light source spectra as well as spectral dependencies of all the opto-electronic components. By dividing the spectrum of the filter glass 324 with the spectrum of the light source 322B (such as received by the reference detector 212C placed behind the filer 208 glass) a spectrum of the filter 208 is measured. This can be compared with the tabulated spectra of filter 208, as described earlier to help perform wavelength calibration.

FIG. 4 shows an example of a spatial light modulator (SLM) 410. For this technique to work best, the SLM 410 should provide as close to as possible, identical modulation coding for the two slits 201A-B. The two slits 201A-B can be mapped at two different vertical spatial locations, such as explained herein, with the spectrum being dispersed in the horizontal direction on the SLM 410 shown in FIG. 4. Some of the choices of SLM 410 are: (1) a rotating patterned disk 411, which is shown in FIG. 4 with the spectrum of the two slits 201A and 201B as 412A and 412B respectively, or (2) a dual array of MEMS mirrors or liquid crystal acting as a light valve 440. The dual arrays can be configured to match the position of the image in which the vertical pair of light valves can provide the same time-varying modulation function for encoding.

Both MEMS devices and liquid crystals are themselves sensitive to vibration and temperature. It is also difficult to maintain identical optical modulation response in any pair even if identical electrical signals are provided, such as can be due to manufacturing defects or slight changes in the alignment. Furthermore, such components can be manufactured for a specific imaging geometry. Any changes in the geometry or requirement on the number light valves may involve a new build of these devices.

A rotating patterned disk 411 (e.g., with transmissive regions (light shading) and opaque regions (dark shading)) can provide a highly uniform and identical response to the light for the pair of slits 201A-B and can be extended to more or even to many more slits at the input. As the modulation disk 411 rotates, the same modulation pattern can be imposed on the spectra of input slits except for the time delay. The time-delay, which turns into phase shift in the mathematically recovered signals, can be ignored in most cases in which the magnitude of the modulation is of interest. The disk pattern of the modulation disk 411 can be easily modified to suit many optical imaging requirements, and the number of modulation codes can be varied by printing a new pattern of light and dark regions on the modulation disk 411. Furthermore, the pattern on the modulation disk 411 can be optimized, such as to help increase or maximize the available dynamic range on the electrical signals produced by the photodetector. The 32-spectral channel disk pattern shown in the modulation disk 411 has been optimized for high dynamic range. A modulation clock can be generated, such as by printing a precision timing clock pattern 420 on the modulation disk 411, such as about its circumference near the peripheral edge of the modulation disk 411. Timing information generated by the clock pattern 420 can be picked up by an optical pick-up sensor with extremely high precision and can serve as synchronization clock for all mathematical recovery, such as to synchronize demodulation to the modulation being provided by the modulation disk 411. The mathematical functions suitable for making these patterns will be periodic in nature, and thus sine and/or cosine functions can form an excellent basis for making the pattern to be printed on the modulation disk 411 to encode the illumination light being provided to the target object 154.

While these patterns are black and white, the output at the photodetector 212 is a convolution of the slit image with the modulation disk 411 pattern and generally produces a much more sinusoidal output.

Figure 5:
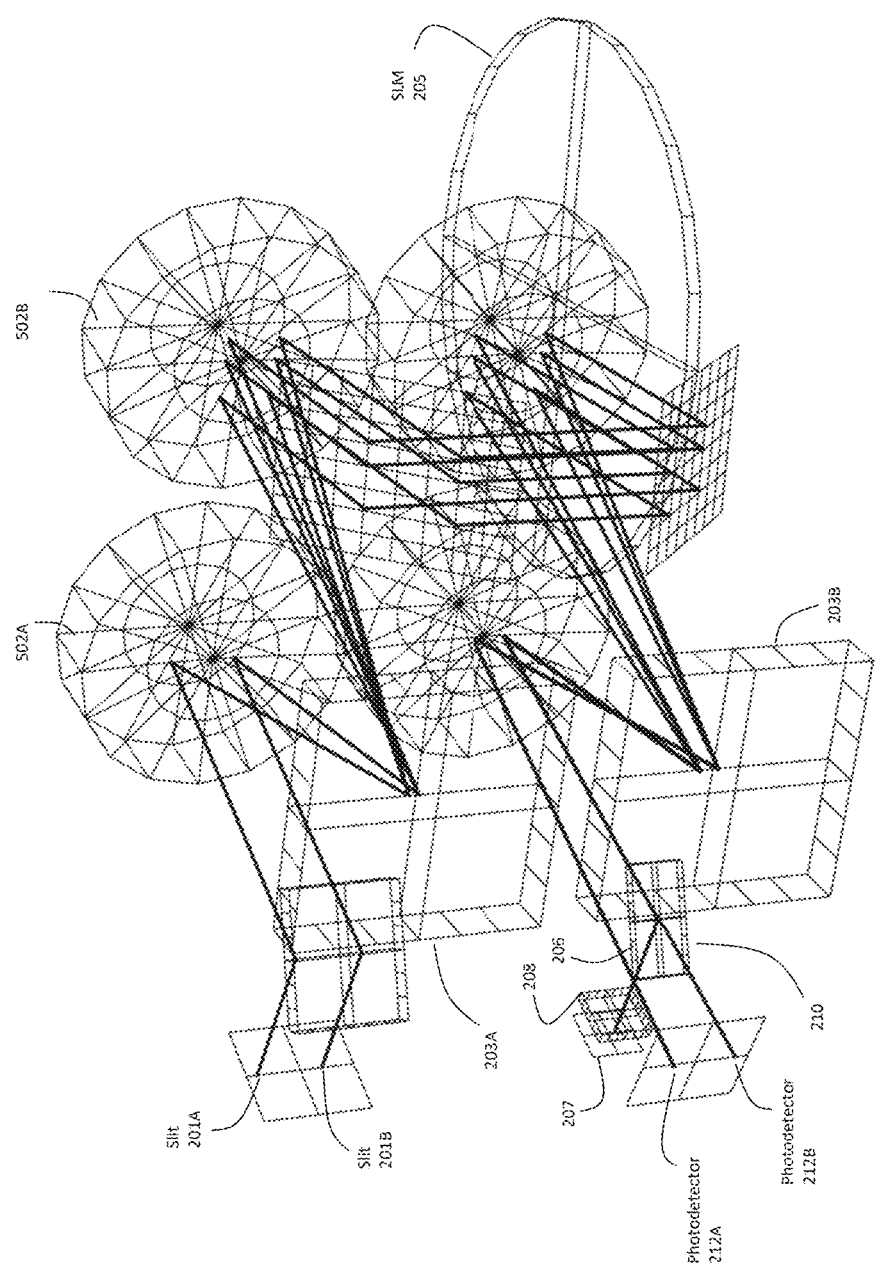
FIG. 5 shows an example of another physical implementation illustrating one more example from many possible configurations.

FIG. 5 shows an example of one of many possible optics geometries available to be used in a coded-light spectrometer such as described herein. As an example, a fully reflective geometry can be used, such as in which lenses 202 are replaced with a series of mirrors 502. Furthermore, the optics geometry can be folded in the vertical dimension in which the SLM 205 lies horizontally. While the arrangement shown in FIG. 5 is a compact version of the arrangement shown in FIG. 2, the principles of measurement and all the key optical aspects are preserved. In general, many combinations of optical components can be made, such as using transmissive or reflective gratings for dispersion and/or using lenses or mirrors as focusing elements. Such arrangements can be configured to optically act equivalent to the arrangements shown in FIG. 2 or 5. The SLM 205 can be made reflective by giving mirror finish to the chrome-on-glass disk pattern or by using a MEMS modulation array. In such a case, modulated light reflected from the SLM 205 can be separated by use of a beam splitter 501 near the input between slit 201 plane and the first focusing mirror 502A or lens 202A. This makes the spectroscopy system even more compact at the cost of light efficiency.

Figure 6:
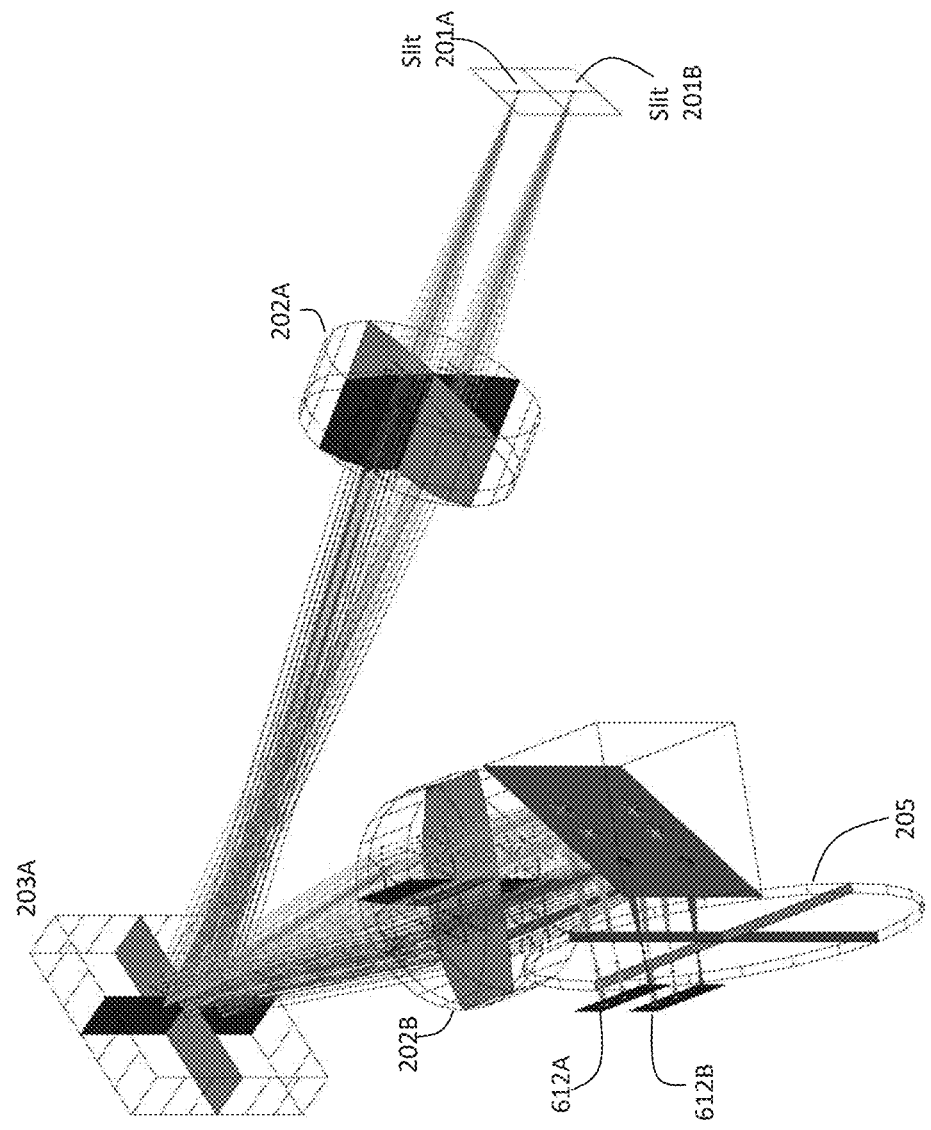
FIG. 6 provides a physically smaller version that reduces the optical component count but may use larger photodetectors.

FIG. 6 shows that if a sufficiently large photodetector 612 is available, then it can be placed directly behind the rotating modulation disk of the SLM 205. The two photodetectors 612A and 612B can be placed downstream in the optical pathway from the SLM 205, such as to receive modulated spectral components of the light from slits 201A and 201B. In this case, modulated components can be measured by the photodetector 612 directly, e.g., without requiring recombining them. This can improve optical efficiency at the cost of using larger area photodetectors. Also, three levels of input slits, with three corresponding photodetectors may be useful, such as in an example in which the two bottom layers of slits are assigned to measuring lamp spectra and the reference spectra while the top input slit measures the spectrum obtained from light that has interacted with the test object 154.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A spectroscopic device for analyzing at least two independent input light sources, the device comprising:

a spectroscopy optics housing, enclosing spectroscopy optics and including a baffle defining a first aperture arranged to receive and transmit into the housing first input light from a first input light source, the baffle also defining a second aperture, spaced apart from the first aperture, and arranged to receive and transmit into the housing second input light from a second input light source that is independent from the first input light source, the housing enclosing:

a commonly-shared optical dispersive system to spatially disperse the first input light and the second input light, respectively received from the first input light source and the second input light source, into corresponding spectral components;

an optical modulator, arranged to provide at least two individually modulated different spectral bin light components that are modulation encoded, using respective different time-varying modulation functions for each of the first and second input light from the corresponding first and second input light sources; and a first and a second light transducer, arranged to receive modulated light from the optical modulator corresponding to an individual one of the first and second input light sources, and to respectively produce a corresponding first and second electrical response signal in response thereto; and signal processing circuitry, coupled to the first and second light transducers to receive and digitize the first and second electrical response signals, and, using information about the respective different time-varying modulation functions, decoding the first and second electrical response signals to recover information about a respective response parameter of the individually modulated different spectral bin light components to provide a spectral bin response of the corresponding first and second input light from the corresponding first and second input light sources.

2. The device of claim 1, wherein one of the first input light or the second input light is further split using a beam splitter after optical modulation and measured by a corresponding one of the first and second light transducers after being transmitted or reflected from an optical wavelength standard to determine a wavelength corresponding to different spectral bin components.

3. The device of claim 1, wherein the first input light corresponds to illumination light used for spectroscopic measurement and that has not interacted with a test object, and the second input light corresponds to illumination light after transmission, reflection, scattering, or other interaction with the test object.

4. The device of claim 1, wherein the first and second light transducers are located downstream in an optical pathway from a spectral combiner that is configured to spectrally combine the individually modulated different spectral bin light components.

5. The device of claim 1, wherein the optical modulator includes a patterned disk configured to produce time varying modulation functions in response to rotation of the disk.

6. The device of claim 1, wherein the signal processing circuitry is configured to perform division of computed spectra of the first input light from the first input light source and the second input light from the second input light source.

7. The device of claim 1, wherein the first and second apertures respectively include first and second slits for the corresponding one of the first and second input light respectively provided by the first and second input light source, wherein the first and second slits are displaced from each other by an opaque region of the baffle to provide slightly different wavelength mapping for the first slit with respect to the second slit.

8. The device of claim 1, wherein the individual first and second light transducers respectively have different signal gains for producing the corresponding first and second electrical response signals respectively corresponding to first input light from the first aperture and to second input light from the second.

9. The device of claim 1, wherein the signal processing circuitry performs analog-to-digital conversion of the first and second electrical response signals synchronously to modulation by the optical modulator.

10. The device of claim 1, wherein the spectroscopic device is configured for measurement of color.

\*  \*  \*  \*  \*